United States Patent
Wang et al.

(10) Patent No.: US 11,818,440 B2
(45) Date of Patent: Nov. 14, 2023

(54) METHOD FOR DISPLAYING MESSAGE ON SMART TELEVISION, AND SMART TELEVISION

(71) Applicant: JUHAOKAN TECHNOLOGY CO., LTD., Qingdao (CN)

(72) Inventors: Guangqiang Wang, Qingdao (CN); Lingsheng Jiang, Qingdao (CN); Dalong Lv, Qingdao (CN); Yimin Li, Qingdao (CN)

(73) Assignee: JUHAOKAN TECHNOLOGY CO., LTD., Qingdao (CN)

( * ) Notice: Subject to any disclaimer, the term of this patent is extended or adjusted under 35 U.S.C. 154(b) by 106 days.

(21) Appl. No.: 17/464,876

(22) Filed: Sep. 2, 2021

(65) Prior Publication Data
US 2021/0400356 A1 Dec. 23, 2021

Related U.S. Application Data

(63) Continuation of application No. PCT/CN2020/099454, filed on Jun. 30, 2020.

(30) Foreign Application Priority Data

Aug. 22, 2019 (CN) .......................... 201910779836.9

(51) Int. Cl.
*H04N 21/488* (2011.01)
*H04N 21/431* (2011.01)
(Continued)

(52) U.S. Cl.
CPC ..... *H04N 21/4882* (2013.01); *H04N 21/4316* (2013.01); *H04N 21/4858* (2013.01);
(Continued)

(58) Field of Classification Search
None
See application file for complete search history.

(56) References Cited

U.S. PATENT DOCUMENTS 9,779,475 B2 * 10/2017 Park ..................... G06F 3/0481
10,001,903 B2 * 6/2018 Yi ....................... G06F 3/04817
(Continued)

FOREIGN PATENT DOCUMENTS

| CN | 104469513 A | 3/2015 |
|---|---|---|
| CN | 104780423 A | 7/2015 |

(Continued)

OTHER PUBLICATIONS

Apr. 21, 2021 First Office Action issued in Chinese Patent Application No. 2019107798369.

*Primary Examiner* — Toan H Vu
(74) *Attorney, Agent, or Firm* — Workman Nydegger

(57) ABSTRACT

A method for displaying a message on a smart television and a smart television are disclosed. The method includes: in response to an instruction for displaying a message received during a video call, determining a window type of the video call displayed on a television screen interface; determining whether a first window of the video call shields a predetermined message display position during display of the first window, based on the window type; in response to the first window shields the predetermined message display position during display, determining a current message display position that is not shielded by the first window on the television screen interface; and displaying a message alert box corresponding to the instruction at the current message display position, and the message alert box is not shielded by the first window.

18 Claims, 7 Drawing Sheets

(51) Int. Cl.
*H04N 21/485* (2011.01)
*G06F 3/0481* (2022.01)

(52) U.S. Cl.
CPC ... *G06F 3/0481* (2013.01); *G09G 2340/0407* (2013.01); *G09G 2340/12* (2013.01)

(56) References Cited

U.S. PATENT DOCUMENTS

| | | | | |
|---|---|---|---|---|
| 10,444,977 | B2* | 10/2019 | Patel | G06F 21/31 |
| 2014/0154986 | A1* | 6/2014 | Lee | H04W 52/0216 |
| | | | | 455/41.2 |
| 2014/0220944 | A1* | 8/2014 | Balasubramanian | ........ |
| | | | | H04W 76/16 |
| | | | | 455/414.1 |
| 2014/0356843 | A1* | 12/2014 | Yang | G09B 5/00 |
| | | | | 434/362 |
| 2015/0121304 | A1* | 4/2015 | Hwang | G06F 3/04845 |
| | | | | 715/803 |
| 2015/0205451 | A1* | 7/2015 | Lee | G06F 3/0481 |
| | | | | 715/766 |
| 2015/0341900 | A1* | 11/2015 | Jeong | H04W 68/02 |
| | | | | 455/458 |
| 2016/0147389 | A1* | 5/2016 | Jeong | H04M 1/72454 |
| | | | | 715/835 |
| 2017/0046496 | A1* | 2/2017 | Johnstone | G06F 16/2228 |
| 2017/0302795 | A1* | 10/2017 | Wolzien | H04L 65/80 |
| 2018/0349283 | A1 | 12/2018 | Bhatia et al. | |
| 2020/0005735 | A1* | 1/2020 | Kim | G06F 3/04817 |

FOREIGN PATENT DOCUMENTS

| | | |
|---|---|---|
| CN | 105635625 A | 6/2016 |
| CN | 106375601 A | 2/2017 |
| CN | 102307318 B | 7/2017 |
| CN | 107678819 A | 2/2018 |
| CN | 109634479 A | 4/2019 |
| CN | 109814975 A | 5/2019 |
| CN | 110582027 A | 12/2019 |
| JP | 2015139200 A | 7/2015 |

* cited by examiner

METHOD FOR DISPLAYING MESSAGE ON SMART TELEVISION, AND SMART TELEVISION

CROSS-REFERENCE TO RELATED APPLICATIONS

This application is a continuation of International Application No. PCT/CN2020/099454 filed Jun. 30, 2020, which claims the benefit and priority of Chinese Patent Application No. 201910779836.9 filed on Aug. 22, 2019. The entire disclosures of the above applications are incorporated herein by reference.

FIELD

The present disclosure relates to smart televisions, in particular to a method for displaying a notification on a smart television and the smart television.

BACKGROUND

This section provides background information related to the present disclosure which is not necessarily prior art.

As smart televisions are becoming more and more popular, televisions are used more often among people. A notification message is usually realized as a pop-up message. In general, The message notification is popped up at a preset fixed position. When a smart television receives a message notification, the message notification pops up at the preset position.

SUMMARY

This section provides a general summary of the disclosure, and is not a comprehensive disclosure of its full scope or all of its features.

A first aspect of the disclosure provides a method for displaying a message on a smart television, including:
  in response to receiving an instruction for displaying a message during a video call, determining a window type of the video call displayed on a television screen interface;
  determining whether a first window of the video call shields a predetermined message display position during display of the first window based on the window type;
  in response to the window type being a type that shields the predetermined message display position during display of the first window, determining a current message display position that is not shielded by the first window on the television screen interface; and
  displaying a message alert box associated with the instruction at the current message display position, and the message alert box is not shielded by the first window.

A second aspect of the disclosure provides a smart television terminal, including:
  a processor; and
  a memory, configured to storage computer programs, the processor is configured to execute computer programs to implement a method for displaying a message on a smart television.

A third aspect of the disclosure provides a non-volatile computer readable storage medium, computer programs are stored thereon and the computer programs are configured to realize a method for displaying a message on a smart television.

A fourth aspect of the disclosure provides a smart television, including a controller and a display, the controller is configured to:
  in response to receiving an instruction for displaying a message during a video call, determine a window type of the video call displayed on a television screen interface;
  determine whether a first window of the video call shields a predetermined message display position during display based on the window type;
  in response to the window type being a type that shields the predetermined message display position during display of the first window, determine a current message display position that is not shielded by the first window on the television screen interface; and
  control the display to display a message alert box corresponding to the instruction at the current message display position, and the message alert box is not shielded by the first window. Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In addition, the described features, structures or characteristics may be combined in one or more exemplary embodiments in any suitable manner. In the following description, many specific details are discussed to give a sufficient understanding of the exemplary embodiments of the disclosure. However, those of skilled in the art will understand that the implementations of the disclosure may be practiced without one or more of the specific details, or other methods, components, steps, etc. may be used. In other cases, well-known structures, methods, implementations or operations are not shown or described in detail in order to avoid minor details and make all aspects of the disclosure clear.

Some of the block diagrams shown in the accompanying drawings are functional entities and do not necessarily correspond to physically or logically independent entities. These functional entities may be implemented in the form of software, or implemented in one or more hardware modules or integrated circuits, or implemented in different networks and/or processor apparatus and/or microcontroller apparatus.

The following describes interface diagrams of smart television apparatus for displaying messages on smart televisions in some scenarios according to some embodiments of the disclosure with reference to FIGS. 1A to 1H, so as to show a general process of the embodiments of the disclosure.

Figure 1A:
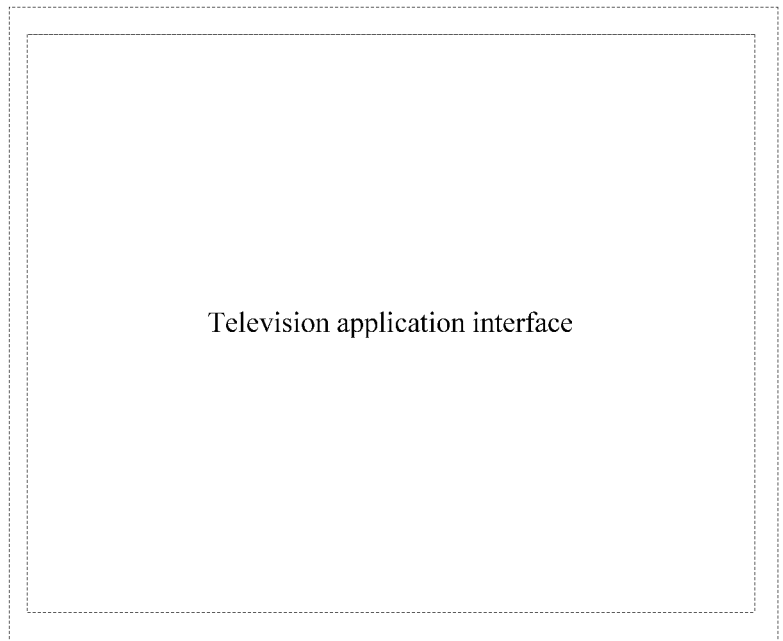
FIGS. 1A-1H illustrate interface diagrams for displaying a message on a smart television in some scenarios according to some embodiments of the disclosure, the diagrams show a general process of displaying messages on the smart television.

As shown in FIG. 1A, a smart television interface presents a television application interface covering a television screen interface (such as a multimedia browsing application interface, a system setting interface, a movie playback interface, etc.), and no message is displayed on the smart television at the moment.

In some embodiments, the television application interface may be a call interface which is not a small window.

Figure 1B:
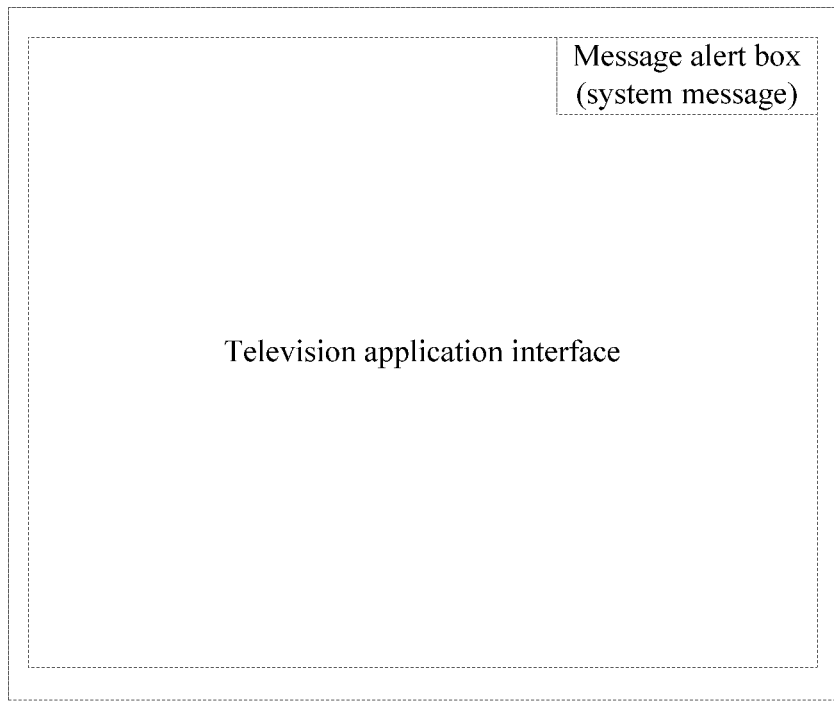

As shown in FIG. 1B, upon receiving an instruction for displaying a system message, a video call is not performed on the smart television, and a message alert box is displayed at a predetermined message display position of a system message on the television interface (an upper right corner of the television interface) to display the system message.

In some embodiments, the predetermined message display position may also set at another position, such as, in a middle area of a top edge of a display region, an entire top edge of the display region, etc.

Figure 1C:
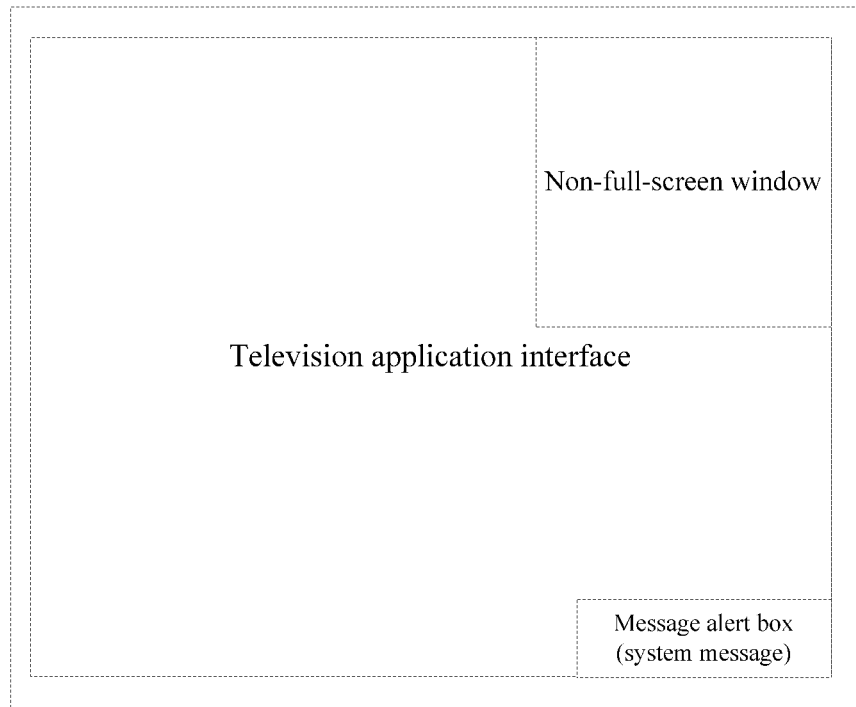

As shown in FIG. 1C, upon receiving an instruction for displaying a system message, the smart television is performing a video call whose window is not a full-screen window (such as a small window floating on the television application interface), and the non-full-screen window is a window type that shields the predetermined message display position where a predetermined display position of the not full-screen window (upper right corner) conflicts with the predetermined message display position of the system message (upper right corner). In this situation, the message alter box is displayed at a current message display position (a lower right corner of the television screen interface) not shielded by the first window.

In some embodiments, the window of the video call is not a full-screen window, which is a small window call interface. And the small window call interface includes a bottom layer for displaying the application interface and a floating layer including a window of the video call, the floating layer is located above the bottom layer. The window of the video call is drawn in the floating layer, and only shields a part of the bottom region at the predetermined position, and image viewing of the bottom layer at other positions outside the window of the video call is not affected.

In some embodiments, in the small window call interface, focus of a remote control of the smart television is located on the bottom layer, and a user may normally control an operation of a control on an application interface of the bottom layer.

Figure 1D:
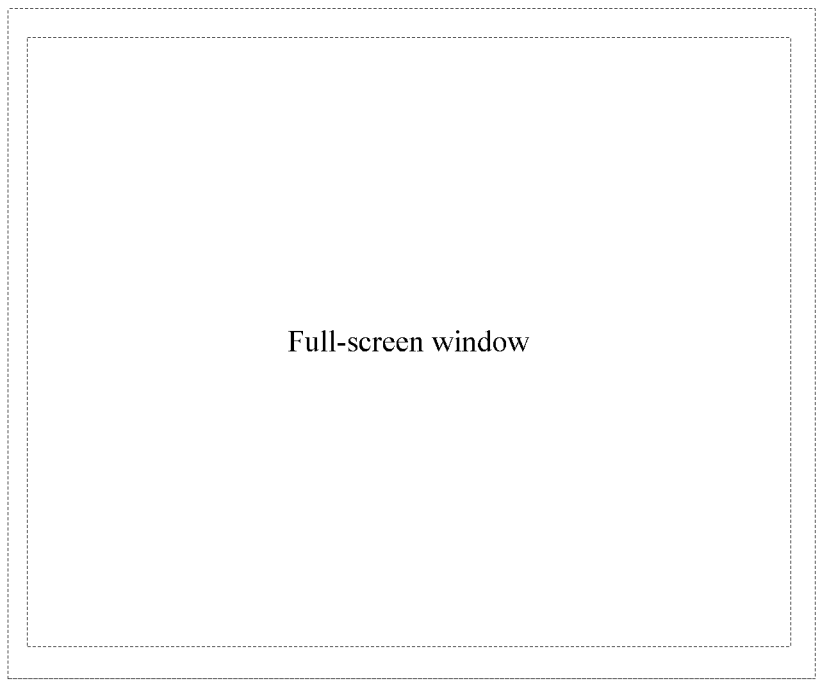

As shown in FIG. 1D, upon receiving an instruction for displaying a system message, the smart television is performing a video call, and a window of the video call is a full-screen window (such as a full-screen window covering the television application interface). The full-screen window is a window type that shields all possible predetermined message display positions during display, for system message alert boxes in lower layers will be shielded by the first window and cannot be presented or invisible.

Figure 1E:
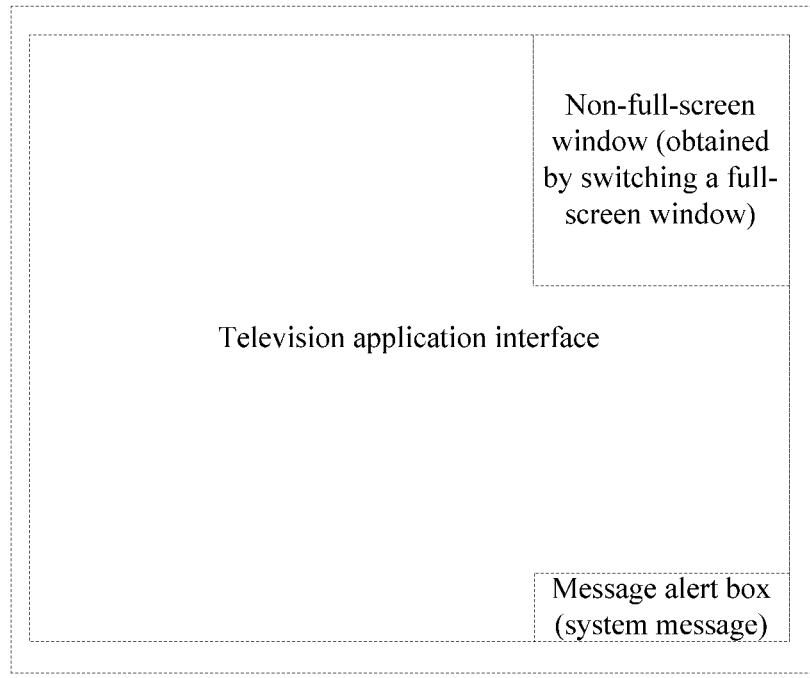

As shown in FIG. 1E, when the full-screen window in FIG. 1D is switched to a non-full-screen window in FIG. 1E, the window is displayed at the upper right corner of the screen, and a region is left for showing a message alert box of the system messages. At the moment, the non-full-screen window obtained from switching still conflicts with the predetermined display position (upper right corner) of the system message, and the message alert box is displayed at a current message display position not shielded by the window of the video call (lower right corner of the television screen interface).

Figure 1F:
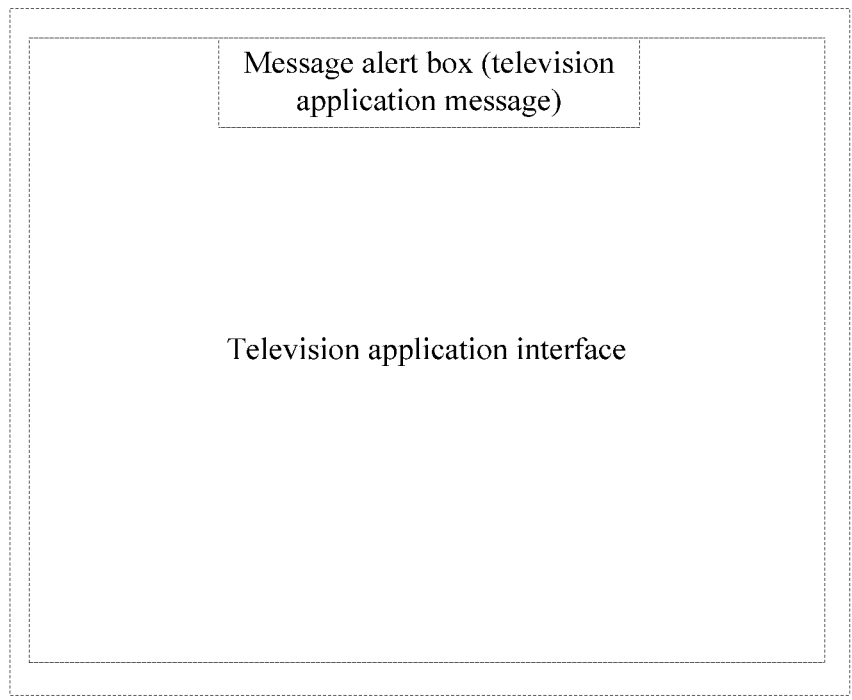

As shown in FIG. 1F, upon an instruction for displaying a television application message, the video call is not performed on the smart television, and a message alert box is displayed at the predetermined message display position of a television application message on the television screen interface (a top edge of the television application interface).

Figure 1G:
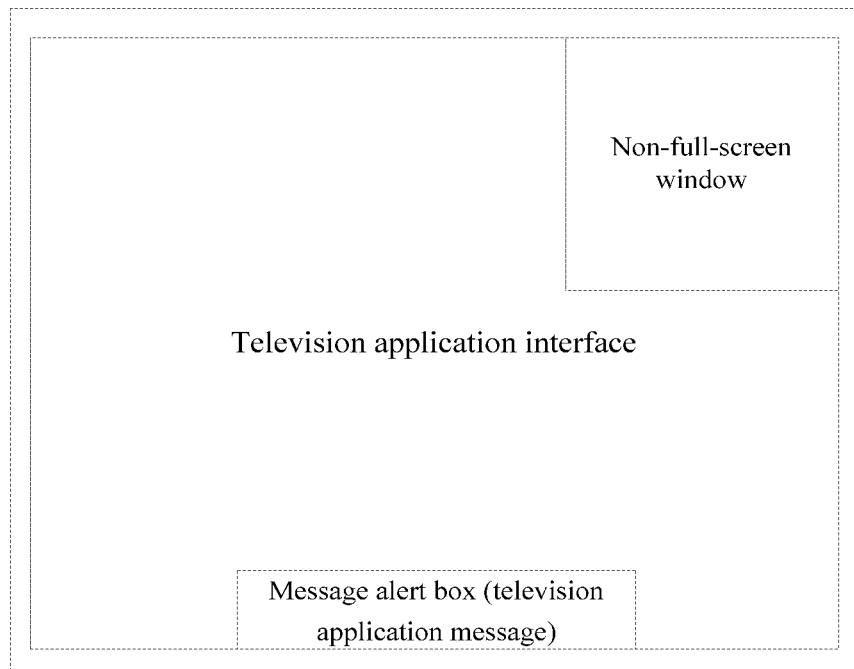

As shown in FIG. 1G, upon receiving a television application message, the smart television is performing a video call, and a window of the video call is a non-full-screen window (such as a small window floating on the television application interface), and the non-full-screen window is a window type that shields the predetermined message display position, the non-full-screen window is supposed on display at upper right corner, while the application message is supposed to display at a top edge of the television application interface. There may be a display conflict of the message alter box and the non-full-screen window due to an overlap of the message alter box and the non-full-screen window. In this case, the message alert box is directly displayed at a current message display position not shielded by the first window (lower part of the television application interface), and if the message alert box of the television application message is at a highest level, the message alert box may partially cover the first window during display, i.e., the display position may be shielded (but the alert box is floating on the upper level of the first window), so that there will be no conflict between the display of the television application interface and the window of the video call and user experience will be improved.

Figure 1H:
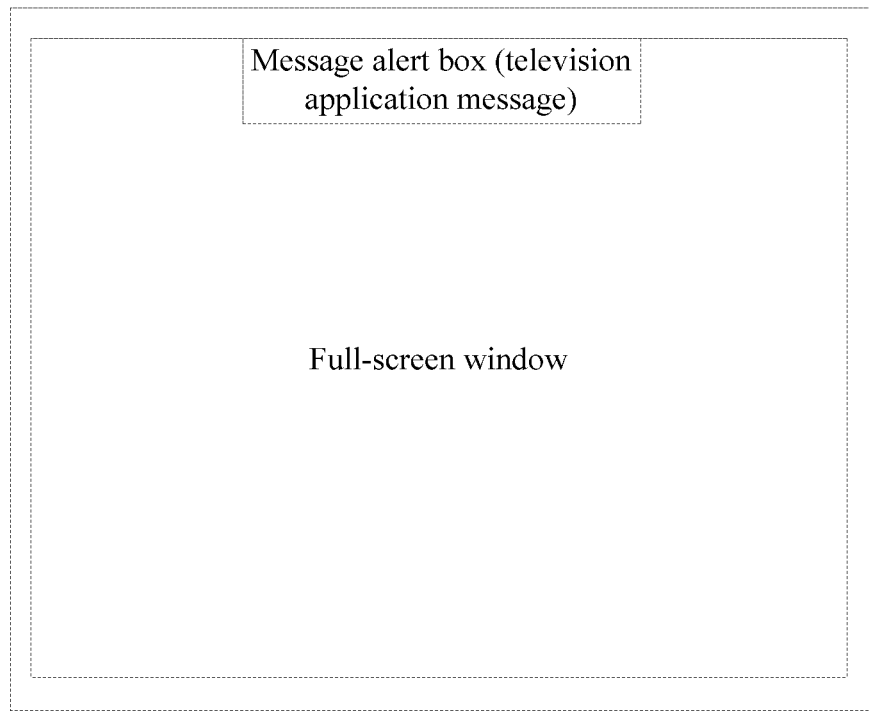

As shown in FIG. 1H, upon receiving an instruction for displaying a television application message, the smart television is performing a video call, and a window for the video call is a full-screen window (covering the television application interface). In this situation, the message alert box of the television application message is at the highest level, although the display position is shielded, the message alert box will float on the full-screen window during display. In this case, as shown in FIG. 1E, the full-screen window may be switched to a non-full-screen window for displaying. In some embodiments, the message alert box of the television application message is directly floating on the first window and is displayed at the predetermined message display position of the television application message (the top of the television application interface), because there is sufficient chatting room during full-screen video calling and displaying without switching the call ensures user experience. In another embodiment, when receiving an instruction for displaying a television application message, the smart television is in a video call, and a window of the video call is a full-screen window, and the television application message is not displayed.

It should be noted that the device interface diagrams above only show a general process of the embodiments of the disclosure as examples, and do not limit the disclosure.

A specific implementation process of the embodiment of the disclosure will be described below.

Figure 2:
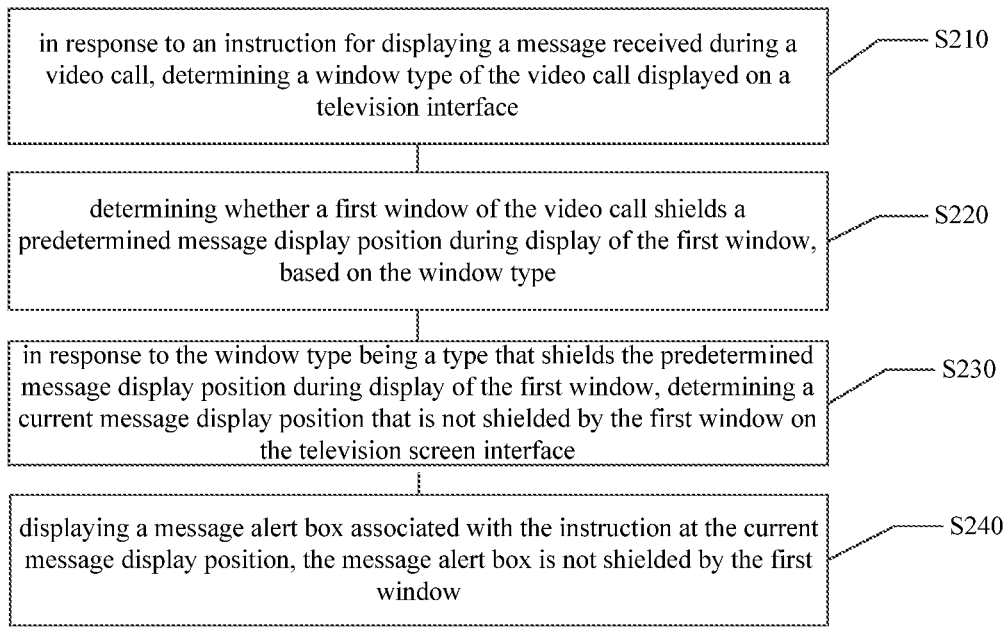
FIG. 2 illustrates a flow chart of a method for displaying a message on a smart television according to some embodiments of the disclosure.

As shown in FIG. 2, some embodiments of the disclosure provide a method for displaying a message on a smart television, including:

step S210: in response to an instruction for displaying a message received during a video call, determining a window type of the video call displayed on a television screen interface;

step S220: determining whether a first window of the video call shields a predetermined message display position during display of the first window, based on the window type;

step S230: in response to the window type being a type that shields the predetermined message display position during display of the first window, determining a current message display position that is not shielded by the first window on the television screen interface; and step S240: displaying a message alert box associated with the instruction at the current message display position, the message alert box is not shielded by the first window.

Specific processes of the steps performed when the message is displayed on the smart television will be described below.

Step S210: in response to an instruction for displaying a message received during a video call, determining a window type of the video call displayed on a television screen interface.

In some embodiments, the instruction for displaying a message may be any instruction on the smart television for indicating displaying a message on the television screen interface. For example, for a system message (such as a message for indicating a unstable signal), a notification center APK regularly inquire from a system side of notification service about whether there is a message. If there is a message for display, an instruction for displaying a system message is issued. For a television application message (such as a Toast notification for indicating end of a program), a television application automatically triggers an instruction for displaying a television application message in some cases.

The window of the video call is a call window with different sizes displayed on the television screen interface when a user uses the smart television for a video call. The window type includes a full-screen window that occupies an entire area of the television screen interface during display and a non-full-screen window that occupies a part of the television screen interface.

Different windows have corresponding identifiers (such as object names), which are configured to invoke a corresponding call window through the identifiers during the video call; different windows have corresponding properties, such as window size, coordinate position, etc.; and in this way, by searching a window identifier invoked during the video call, the window type of the first window corresponding to the video call displayed on the television screen interface may be determined.

In some embodiments, determining the window type of the video call displayed on the television screen interface includes:
 obtaining a system parameter for indicating a window type which is determined when creating the window of the call video; and
 determining the window type of the video call according to the system parameter for indicating the window type.

Through the television and other television applications, a parameter of the television is defined, and different system parameters (including start of the video call, window types (a full-screen window, a non-full-screen window, a floating window, etc.), close of the window, video call disconnection and other scenes) are respectively defined according to video call status changes, so the window type may be obtained in real time.

In some embodiments, determining the window type of the video call displayed on the television screen interface includes:
 obtaining a window identifier of the video call displayed on the television interface; and
 determining the window type of the video call according to a window mode associated with the window identifier.

The window identifier may be an object name when creating a window for the video call, which indicate the window uniquely. The window identifier is associated with a window mode of the video call (window size properties, such as a size designed to suit a screen interface or a predetermined size). Thus, by obtaining the window identifier of the window, the window type of the video call (such as a full-screen window or a non-full-screen window) may be determined based on the window mode associated with the window identifier.

With further reference to FIG. 2, step S220: determining whether a first window of the video call shields a predetermined message display position during display of the first window, based on the window type.

In some embodiments, the predetermined message display position is a position of a predetermined coordinate of the message alert box on the television screen interface. When a message is a system message, the predetermined message display position may be set in an upper right corner of a screen (in a predetermined region at the upper right corner of the television screen interface, such as a square region of 100*100 pixels at the upper right corner with a pixel of a bottom leftmost corner of the television screen being the coordinate origin). When the message is a television application message, the predetermined message display position may be set at a top part of a television application (a predetermined region at the top part of the television screen interface, such as a top region between a topmost edge of the television screen interface and an edge moving down a predetermined distance from the topmost edge).

Generally, window types include a full-screen window and a non-full-screen window. When a full-screen window is displayed, it covers the television entire interface, i.e. covering the predetermined message display position. When the non-full-screen window is displayed, it does not cover all regions of the television screen interface, but when a predetermined display position of the non-full-screen window conflicts with the predetermined message display position (the predetermined display position of the non-full-screen window and the predetermined message display position are in a same region of the television screen interface), the predetermined message display position may be shielded, causing incomplete display of the message and affecting the user experience. Since the predetermined display position of the non-full-screen window and the predetermined message display position are in the same region of the television screen interface, it may be determined that the non-full-screen window is a type that shields the predetermined message display position during display. By determining whether the first window of the video call is the type that shields the predetermined message display position during display of the first window, displaying may be adjusted timely while displaying the window of the video call.

It should be noted that shielding of the predetermined message display position while displaying the first window of the video call includes an overlap area between a region occupied by the first window and a screen region corresponding to the predetermined message display position. In this way, even if the first window and the message alert box are not overlapped, due to concentrated display, the experience of watching and chatting is affected. In this case, the predetermined message display position is also regarded as being shielded while displaying the first window.

In some embodiments, determining whether the first window of the video call shields the predetermined message display position during display of the first window, based on the window type includes:
  if the window type is a full-screen window, determining that the first window of the video call shields the predetermined message display position during display of the first window; and
  if the window type is a non-full-screen window, determining whether the first window of the video call shields the predetermined message display position during display of the first window according to a predetermined display position of the first window.

When a full-screen window is displayed, it covers all regions of the television screen interface and will shield the predetermined message display position. Therefore, when the window type is a full-screen window, it may be determined that the window type of the first window is the type that shields the predetermined message display position during display. When a non-full-screen window is displayed, it does not cover all regions of the television screen interface. Therefore, when the window type is a non-full-screen window, it may determine whether the predetermined display position of the first window conflicts with the predetermined message display position (that is, whether the predetermined display position of the non-full-screen window and the predetermined message displaying position are in the same region of the television screen interface), so as to determine whether the first window is the type that shields the predetermined message display position during display. It is noted that the television screen interface may be divided into multiple display regions in advance, among which a part of the display regions (such as the upper right corner region or the upper region of the screen interface) may be used to display the non-full-screen window or the message alert box.

In some embodiments, determining whether the first window of the video call shields the predetermined message display position during display of the first call, based on the window type includes:
  if the window type is a non-full-screen window, due to partial overlap between the first window of the video call and the message alert box, the first window of the video call is determined as the type that shields the predetermined message display position during display.

A position of the message alert box on the television screen interface may be determined by setting the coordinate of an upper right corner of the message alert box on the television screen interface and based on a size of the message alert box (pixel region occupied). The position of the first window of the video call may also be determined by setting the coordinate of an upper right corner of the first window of the video call on a desktop of the television screen and based on a size of a call box. It should understand that a corner corresponding to the coordinates of the call box and the message alert box may be any corner, such as a lower right corner, an upper left corner, and so on.

Furthermore, when the first window of the video call and the message alert box occupy a same region, it means that the first window and the message alert box partially overlap, and the first window is determined to be the type that shields the predetermined message display position during display of the first window.

In some embodiments, determining whether the first window of the video call shields the predetermined message display position during display according to the predetermined display position of the first window includes:
  if the predetermined display position of the first window overlaps with the predetermined message display position, determining that the first window shields the predetermined message display position during display of the first window; and
  if the predetermined display position of the first window does not overlap with the predetermined message display position, determining that the window type does not shield the predetermined message display position during display of the first window.

Both the predetermined display position of the first window and the predetermined message display position may be determined by the coordinates of the first window of the video call and the message alert box in the television screen interface. Therefore, the television screen interface may be divided into a plurality of small regions. By determining that the coordinates of the first window of the video call and the message alert box are in the same region, it is determined that the predetermined display position of the first window of the video call overlaps with the predetermined message display position, i.e. the predetermined display position of the first window and the predetermined message display position occupy a same area, and by determining that the coordinates of the first window and the message alert box are not in the same region, it is determined that the predetermined display position of the first window does not overlap with the predetermined message displaying position, that is, the predetermined display position of the first window and the predetermined message displaying position do not occupy a same area.

In another implementation, based on that a distance between the coordinates of the first window of the video call and the message alert box is smaller than a predetermined threshold, it may be determined that the predetermined display position of the first window overlap with the predetermined message displaying position; and based on that the distance between the positioning coordinates of the first window and the message alert box is larger than the predetermined threshold, it may be determined that the predetermined display position of the first window of the video call does not overlap with the predetermined message display position. The predetermined threshold is determined based on a maximum size value of the message alert box, a maximum size value of the first window, and a distance between the coordinates when the first window does not overlap with the message alert box on the screen interface.

In some embodiments, it is assumed that the display position of the non-full-screen window overlap with the predetermined message display position, that is, the display position of the non-full-screen window is configured to locate in an area which overlaps with the predetermined message display position, the determining whether the first window of the video call shields the predetermined message display position during display of the first window, based on the window type includes:

in response to the window type being a non-full-screen window, determining that the first window shields the predetermined message display position during display of the first window; and in response to the window type being a full-screen window, determining whether the video call is disconnected, and in response to the video call being connected, determining that the first window shields the predetermined message display position during display of the first window.

First, whether the window type of the video call is a non-full-screen window is determined; if the window type is a non-full-screen window, since the predetermined display position of the non-full-screen window overlaps with the predetermined message display position, it is directly determined that the predetermined message display position is shielded while the first window of the video call is being displayed; and if the window type is not a non-full-screen window, which means the first window is a full-screen window, whether the video call is disconnected is determined, and if it is connected, which means the first window of the video call covers all the television screen interface, the window type of the video call is determined to be the type that shields the predetermined message display position during display.

With further reference to FIG. 2, step S230: in response to the window type being a type that shields the predetermined message display position during display of the first window, determining a current message display position that is not shielded by the first window on the television screen interface.

In some embodiments, the current message display position not shielded by the first window of the video call may be an area outside the first window on the television screen interface. When a message to be displayed is a system message, a system message alert box is of a lower level and is located at a lower layer below the first window during display. And if there is a conflict between the two positions, the system message alert box will be shielded by the first window. In this case, the current message display position not shielded by the first window needs to be completely not cross with the first window.

When a message to be displayed is a television application message, a television application message alert box is of a higher level and will float on the first window during display, and if there is a conflict between the two positions, the first window will be shielded. In some embodiments, when a message to be displayed is a television application message, if the first window is a non-full-screen window, and the first window is shielded by the message alert box, it is not convenient for the call. The current message display position not shielded by the first window needs to be completely not overlapped with the first window. However, when a message to be displayed is a television application message, if the first window in full screen form includes an area which is shielded by the message alert box, because an overall ratio of the shielded region to the full-screen window is low, the call is almost unaffected, and in this case, the predetermined message display position may be determined to be the current message display position.

The current message display position may be a predetermined substitute not conflicting with a real-time display position of the first window (meaning the current message display position and the real-time display position of the first window are not in the same region of the television screen interface). By obtaining the current display position, the message may be displayed at the current position when the position of the first window conflicts with an original message display position in a scenario where viewing and chatting are performing concurrently.

In another implementation, if the window type is the type that shields the predetermined message display position during display, and when the window type is a full-screen window, the current message display position not shielded by the first window is not obtained from the television screen interface.

In this way, the message may be not displayed in subsequent steps so that user call experience is not affected.

In some embodiments, determining the current message display position that is not shielded by the first window from the television screen interface includes:

if the first window is a non-full-screen window, obtaining a substitute position associated with the predetermined message display position on the television screen interface as the current message displaying position, the substitute position is located in a region not occupied by the first window with a predetermined size on the television screen interface.

The substitute position is a predetermined alternate position for displaying the message when the predetermined message display position conflicts with the first window displaying position. The current message display position may be determined by pre-setting coordinates of the alternative position. A plurality of display regions are divided on the television screen interface in advance (adjacent display regions may have partially overlapping regions), and regions occupied by the first window with predetermined sizes may be a plurality of display regions occupied by the first window on the television screen interface based on the coordinate of the first window and the size of the first window, so that a position of a region on the television screen interface that is not occupied by the first window with the predetermined size may be determined and the substitute position may be set. In another implementation, the television screen interface is not divided into the plurality of display regions, and the region occupied by the first window with the predetermined size is a pixel region of the television screen interface occupied by the first window determined based on the coordinate of call window and the size of the first window.

In some embodiments, if the first window is a non-full-screen window, obtaining a current message display position that is not shielded by the first window from the television screen interface includes:

obtaining a coordinate of the first window and a width and a height of the first window;

based on the coordinate of the first window and the width and the height of the first window, determining a region covered by the first window on the television screen interface; and obtaining a position outside the region covered by the first window on the television screen interface as the current message display position.

The coordinate of the first window and the width and the height of the first window may be obtained from property values for creating the first window. For example, when the coordinate of the first window is in the upper right corner, an area of the first window may be calculated through the width and the height, and any position outside the region covered by the non-full-screen window may be determined based on a real-time position of the window and the current message display position is obtained, so that no shielding of the message displayed at the current message displaying position is guaranteed.

In some embodiments, when the second window is a non-full-screen window, obtaining the current message display position that is not shielded by the first window on the television screen interface includes:
  if the first window is a full-screen window, switching the first window to a second window and displaying the second window at a predetermined position of the television screen interface; and
  obtaining a substitute position associated with the predetermined position on the television screen interface as the current message display position,
  the substitute position is located in a region not occupied by the second window on the television screen interface.

By switching the full-screen window of the video call to the second window which is a non-full-screen window, a position for displaying any type of messages will be saved. The message is displayed at a predetermined position on the television screen interface, and the predetermined position may be any position on the television screen interface, for example, the predetermined message display position. Because the second window is of a predetermined size, the substitute position associated with the predetermined position may ensure that the current message display position is located in a region not occupied by the second window with the predetermined size. Switching may be realized in a way of invoking and creating the second window with the predetermined size for the video call in the background, and automatic switching may be realized when a full-screen window is detected, or switching may be manually realized by the user.

In some embodiments, if the first window is a full-screen window, switching the first window to be the second window includes:
  if the first window is the full-screen window and a message to be displayed which associates with the instruction for displaying a message is a system message, switching the first window to be the second window.

In some embodiments, a plurality of second windows comprises multiple sizes of non-full-screen windows, and the second windows are non-full-screen windows, switching the first window to the second window includes:
  obtaining a size of a message alert box of the message corresponding to the instruction;
  calculating a maximum value of the sizes of the second windows according to the size of the message alert box and a size of the television screen interface; and
  switching a first call window to be any second window with a size smaller than the maximum value of the preset second windows.

The message alert box of the message is self-adaptively generated according to message display content, and a width, height, etc. of its properties may be obtained. According to the size of the message alert box and the size of the television screen interface, the maximum value of the size of the second window is calculated. A difference value between the width of the television screen interface and the width of the message alert box may be taken as a maximum value of a width the second window, and a difference value between the height of the television screen interface and the height of the message alert box is taken as a maximum value of a height of the second window, so that the maximum value of the size of the second window is calculated. Furthermore, the first call window may be switched to any one of the plurality of the second windows whose size is smaller than the maximum value of the second window, so as to ensure call quality and user experience.

In some embodiments, obtaining the current message display position that is not shielded by the first window from the television screen interface includes:
  if the first window is a full-screen window and a message to be displayed is a television application message, determining the predetermined message displaying position as the current message displaying position that is not shielded by the first window.

When the message to be displayed is the television application message, the television application message alert box is of a higher level and will float above the first window. In this case, when the first window is a full-screen window, the predetermined message display position is determined as the current message display position that is not shielded by the first window, and the message may still be displayed at the predetermined message display position during a full-screen call. Since the full-screen window is large enough, high-quality calls may be made clearly while displaying messages. The user experience is guaranteed. In this case, the predetermined message display position may be regarded approximately as a position that is not shielded by the first window.

With further reference to FIG. 2, step S240: displaying a message alert box associated with the instruction at the current message displaying position, the message alert box is not shielded by the first window.

In some embodiments, by displaying the message alert box at a coordinate corresponding to the current message display position, because the current display position is the position not shielded by the first window, it may be guaranteed that the message display position does not conflict with the display position of the first window and the user experience is effectively improved.

In the embodiment shown in FIG. 2, while a the video call is on the smart television, and the window type is the type that shields the predetermined message display position during display, the current message display position not shielded by the first window is obtained from the television screen interface for message displaying. Therefore, message displaying is completely unshielded while video chatting is performed on the smart television, the message may be displayed under any scenarios, and the user experience is significantly improved.

In some embodiments, based on the foresaid embodiments, if a to-be-displayed message corresponding to the instruction is a system message, the predetermined message display position is located at the upper right corner of the television screen interface.

The current message display position includes:
  if the window type is a non-full-screen window and the predetermined display position is a upper right corner of the television screen interface, the current message display position is located at a lower right corner of the television screen interface.

Alert of the system message is performed at the upper right corner of the television screen interface (a predetermined region at the upper right corner, such as a square region at the upper rightmost corner), the best viewing experience of the user may be guaranteed. Usually the position of the non-full-screen window is also located at the upper right corner of the television screen interface, and there will be a conflict between the both. First of all, they will cover the upper part of the television application interface, and there may be shielding between each other. In this situation, the current display position is determined to be a lower right corner of the television screen interface. If there is a conflict, the position that is not shielded by the first window may be obtained to ensure that the message may be displayed properly under any circumstances, and to ensure that the impact on the view experience of the application interface on the television is minimized. In the embodiment, the non-full-screen window may be obtained by switching from the full-screen window.

In some embodiments, based on the foresaid embodiments, when a to-be-displayed message corresponding to the instruction is a television application message, the predetermined message display position is located at the top of the television application interface.

The current message display position includes:
if the window type is a non-full-screen window and the predetermined display position is an upper right corner of the television screen interface, the current message display position is located on the lower part of the television application interface; and
if the window type is a full-screen window, the current message display position overlaps with the predetermined message display position.

The top of the television application interface (television applications generally cover entire region of the television screen interface) displays the television application message, which may ensure that the impact of message display on the television application browsing experience is minimized. Generally, the non-full-screen window is located at the upper right corner of the television screen interface, the upper right corner and the top overlap, and they are displayed on the upper part of the television screen interface at the same time, so they may shield each other. In this case, the upper part of the television application interface will be shield greatly, which will affect user's experience. At the moment, the current message display position is located at the lower part of the television application interface. If there is a conflict, the position that is not shielded by the first window may be obtained to ensure that both the message and the video call window may be displayed at the same time under any circumstances, without mutual impact and to ensure that the view impact on the application interface on the television is minimized. If the window type is a full-screen window, because the television application message alert box is of a higher level, it will float above the first window. The current message display position overlaps with the predetermined message display position. The call interface is large enough and only a small part of a region will be shielded by the message box. The message is displayed directly at the predetermined message display position without affecting user's experience.

In an implementation, when the window type is a full-screen window, the current message display position is void. Therefore, the message is not displayed during a full-screen window call.

In an implementation, the method further includes:
in response to receiving an instruction for displaying a message, determining whether a video call is performed on the smart television; and
if it is determined that no video call is performed on the smart television, displaying a message to be displayed associated with the instruction on the predetermined message display position.

When the message displaying instruction is received, by determining whether a local video on the smart television is turned on or whether parameters written into the system when starting a video call component can be obtained, whether the video call is on the smart television may be determined, and if it is determined that no video call is performed on the smart television and there is no conflict, the to-be-displayed message corresponding to the instruction may be displayed at the predetermined message display position.

The aforesaid embodiments will be described in detail below in combination with a process of displaying a message on the smart television in a scenario.

Figure 3:
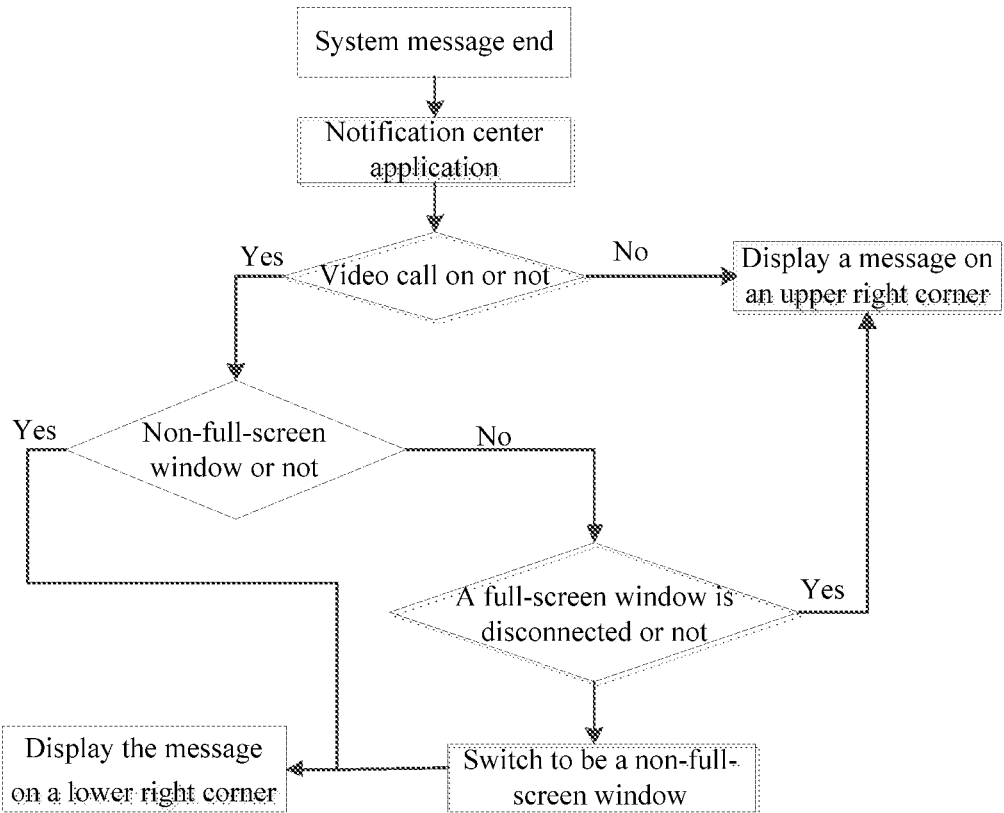
FIG. 3 illustrates a flow chart of displaying a message on a smart television in a scenario according to some embodiments of the disclosure.

FIG. 3 illustrates a flow chart of displaying a message on a smart television in a scenario according to some embodiments of the disclosure.

As shown in FIG. 3, a notification center APK regularly inquire notification service of a system side about whether there is a message. If there is a message, an instruction for displaying a message is issued, and in this case, whether a video call is on the smart television is detected. If not, i.e. no video call is on, the message is displayed at the upper right corner (the predetermined system message display position is at the upper right corner), and a message notification pops up at the upper right corner of the screen. If a video call is on, whether it is a non-full-screen window or not is further determined. If chatting is performed in a non-full-screen window mode, the message is displayed at the lower right corner, because the non-full-screen window is already displayed at the upper right corner (the predetermined non-full-screen window display position is at the upper right corner). If chatting is not performed in a non-full-screen window mode, it is determined that a full-screen window is used. In this case, whether the call is disconnected is further determined; if so, the message is directly displayed at the upper right corner (the predetermined system message display position is at the upper right corner); and if not, the full-screen window is switched to be a non-full-screen window (the predetermined non-full-screen window display position is at the upper right corner), and message information is automatically displayed at the lower right corner.

In the embodiment shown in FIG. 3, if the predetermined display position of the non-full-screen window conflicts with the display position of the system message, the message display position is automatically switched without being shielded by the first window, and when the full-screen call is switched to the non-full-screen window, the message display position is automatically switched, so that the message may be displayed in any scenarios and the user's experience of viewing and chatting is ensured.

Figure 4:
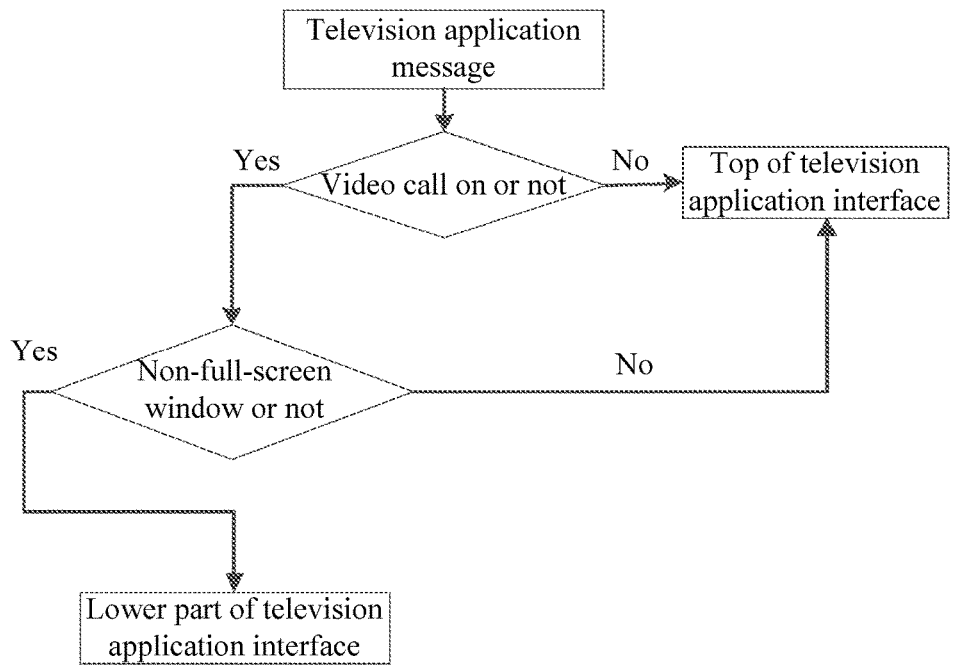
FIG. 4 illustrates a flow chart of displaying a message on a smart television in another scenario according to some embodiments of the disclosure.

FIG. 4 illustrates a flow chart of displaying a message on a smart television in another scenario according to some embodiments of the disclosure.

As shown in FIG. 4, in order to remind the user, television application messages, such as toasts, often pop up in the television application, and a predetermined layout is to place the messages at the top of the television application interface.

When a television application message is triggered to pop up due to certain conditions, whether a video call is on will be determined. If no video call is on, the message will be displayed at the top of the television application interface. If a video call is on, whether it is a non-full-screen window call is further determined. If it is a non-full-screen window call, the message is displayed at the bottom of the television application interface; and if it is not a non-full-screen window, i.e. a full-screen window call, the message is displayed directly at the top of the television application interface (predetermined position).

In the embodiment in FIG. 4, when the predetermined display position of the non-full-screen window conflicts with the display position of the television application message, the message display position is automatically switched, so that the first window does not conflict with the message display position, and it is ensured that they will not shield each other. Meanwhile, during chatting in a full-screen window, since the television application message is of a high display level, it is directly displayed in the predetermined message display position, and only a portion of the large chat window is shielded, so that the message may be displayed in any scenario and the user's experience of viewing and chatting is ensured.

Figure 5:
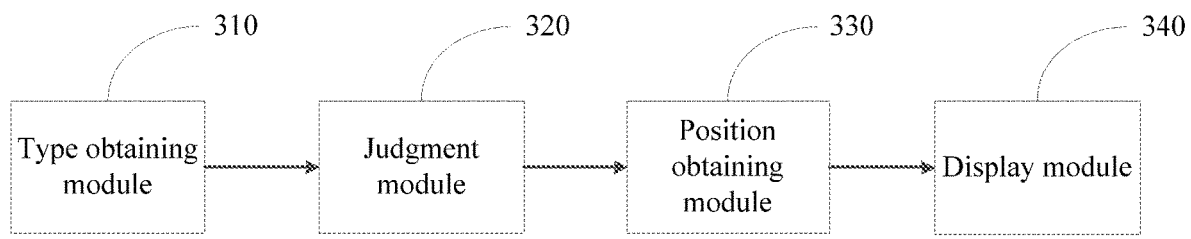
FIG. 5 illustrates a module diagram of an apparatus for displaying a message on a smart television in some embodiments of the disclosure.

As shown in FIG. 5, an embodiment of the disclosure further provides an apparatus for displaying a message on a smart television, including:

a type obtaining module 310, configured to, in response to receiving an instruction for displaying a message during a video call, obtain a window type of the video call displayed on a television screen interface;

a determination module 320, configured to, determine whether the first window shields a predetermined message display position during display of the first window, based on the window type;

a position obtaining module 330, configured to, in response to the window type being the type that shields the predetermined message display position during display of the first window, obtain a current message display position that is not shielded by the first window on the television screen interface; and a display module 340, configured to display a message alert box corresponding to the instruction at the current message display position, and the message alert box is not shielded by the first window.

The method for displaying a message on the smart television may be realized by the smart television. The smart television according to an embodiment of the disclosure will be described below with reference to FIG. 6. The smart television shown in FIG. 6 is only an example, and should not limit functions and scope of the embodiments of the disclosure.

Figure 6:
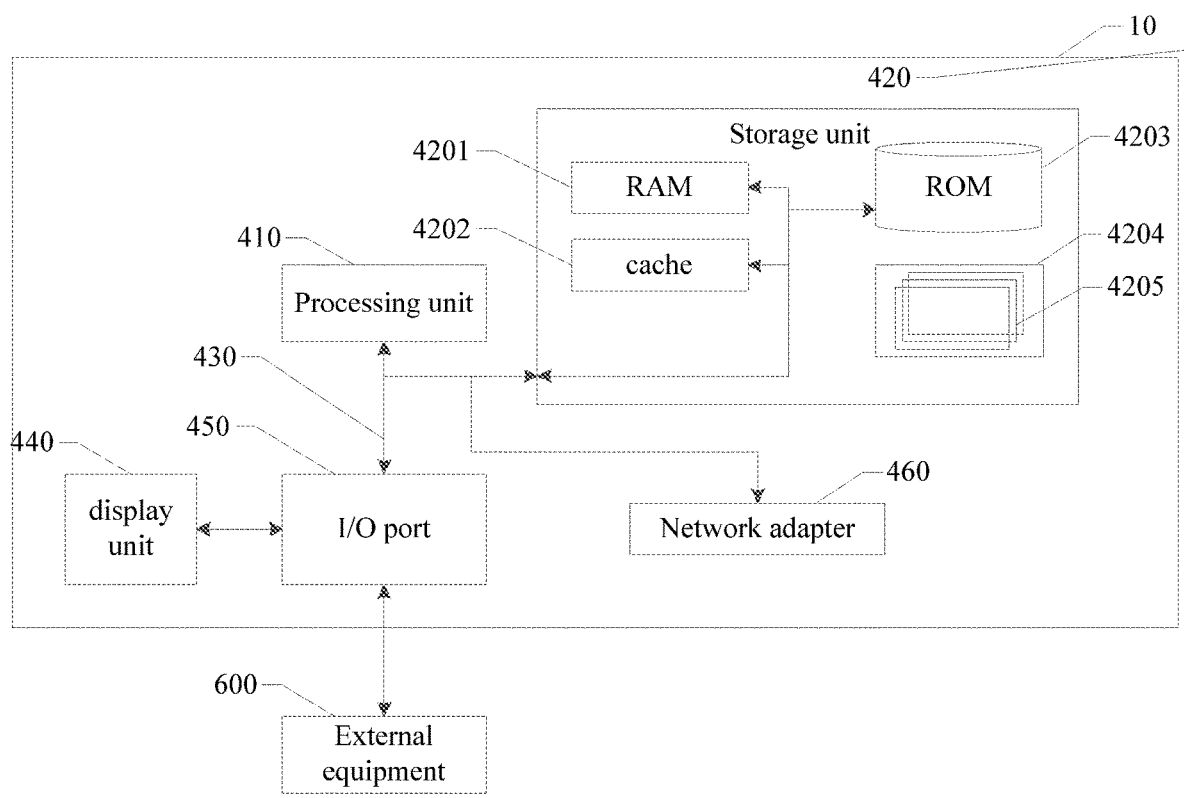
FIG. 6 illustrates a hardware structure diagram of a general device according to some embodiments of the disclosure.

As shown in FIG. 6, the smart television is implemented in a form of general-purpose computing device. Components of the smart television may include, but are not limited to, at least one processing unit 410, at least one storage unit 420, and a bus 430 connecting different system components (including the storage unit 420 and the processing unit 410). The smart television may realize displaying through a display unit 440.

The storage unit stores program instructions, and the program instructions may be executed by the processing unit 410, so that the processing unit 410 executes steps of various exemplary implementations described in the above exemplary method in this specification. For example, the processing unit 410 may perform various steps as shown in FIG. 2.

The storage unit 420 may include a non-volatile readable medium. The storage unit 420 may comprise a random access storage unit (RAM) 4201 and/or a cache storage unit 4202, and may further include a read-only storage unit (ROM) 4203.

The storage unit 420 may further include a program/utility tool 4204 with a set of (at least one) program module 4205. Such program module 4205 includes but is not limited to: an operating system, one or more applications, other application modules, and application data. Each or some combination of these examples may include implementation of a network environment.

The bus 430 may represent one or more bus structures, including a storage unit bus or a storage unit controller, a peripheral bus, a graphic acceleration port, a processing unit, or a local bus using any bus structure among multiple bus structures.

The smart television may also communicate with one or more external devices 600 (such as keyboards, pointing devices, Bluetooth devices, etc.), and may also communicate with one or more devices that enable a user to interact with the smart television, and/or communicate with any device (such as routers, modems, etc.) that enable the smart television to communicate with one or more other computing devices. The communication may be performed through an input/output (I/O) port 450. In addition, the smart television may also communicate with one or more networks (for example, a local area network (LAN), a wide area network (WAN), and/or a public network, such as the Internet) through a network adapter 460. As shown in the figure, the network adapter 460 communicates with other modules of the smart television through the bus 430. It should be understood that although not shown in the figure, other hardware and/or software modules may be used in conjunction with the smart television, including but not limited to: microcode, device drivers, redundant processing units, external disk drive arrays, RAID systems, tape drives, and data backup storage systems, etc.

Through the description of the above implementations, those of skilled in the art can easily understand that the exemplary implementations described here may be implemented by software, or may be implemented by combining software with necessary hardware. Therefore, the embodiments of the disclosure may be implemented in the form of a software product, which may be stored in a non-volatile storage medium (CD-ROM, USB flash disk, mobile hard disk, etc.) or on a network, including instructions to cause a computing device (a personal computer, a server, a terminal apparatus, or a network device, etc.) execute the method according to the implementations of the disclosure.

Exemplary embodiments of the disclosure further provide a non-transitory computer program medium, and computer-readable instructions are stored thereon, and when the computer-readable instructions are executed by a processor of a computer, the computer is caused to execute a part of the foregoing method described in the embodiments.

Embodiments of the disclosure further provide a program product for implementing the method in the above embodiments. The program product may adopt a portable compact disk read-only memory (CD-ROM) and include program codes, and may be run on a terminal device, such as a personal computer. However, the program product of the disclosure is not limited to this. In this document, a readable storage medium may be any tangible medium that contains or stores programs, and the programs may be used by or combined with an instruction execution system, apparatus, or element.

The program product may use any combination of one or more readable media. The storage medium may be, for example, but not limited to, an electrical, magnetic, optical, electromagnetic, infrared, or semiconductor system, apparatus, or element, or a combination of any of the above. More specific examples (non-exhaustive list) of readable storage media include: at least one of electrical connections with one or more wires, portable disks, hard disks, random access memory (RGM), read-only memory (ROM), erasable programmable read-only memory (EPROM or flash memory), optical fiber, portable compact disk read-only memory (CD-ROM), optical storage elements, and magnetic storage elements.

In addition, although various steps of the method in the disclosure are described in a specific order in the accompanying drawings, this does not require or imply that these steps must be performed in the specific order, or that all the steps shown must be performed to achieve a desired result. Additionally or alternatively, some steps may be omitted, multiple steps may be combined into one step for execution, and/or one step may be decomposed into multiple steps for execution, etc.

Through the description of the above implementations, those of skill in the art can easily understand that the exemplary implementations described here may be implemented by software, or may be implemented by combining software with necessary hardware. Therefore, the embodiments of the disclosure may be implemented in the form of a software product, which may be stored in a non-volatile storage medium (CD-ROM, USB flash disk, mobile hard disk, etc.) or on a network, including instructions to cause a computing device (a personal computer, a server, a mobile terminal, or a network device, etc.) execute the method according to the implementations of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for displaying a message on a smart television, comprising:
in response to an instruction for displaying a message received during a video call, determining a window type of the video call displayed on a television screen interface;
determining whether a first window of the video call shields a predetermined message display position during display of the first window, based on the window type;
in response to the window type being a type that shields the predetermined message display position during display of the first window, determining a current message display position that is not shielded by the first window on the television screen interface; and
displaying a message alert box associated with the instruction at the current message displaying position, wherein the message alert box is not shielded by the first window.

2. The method according to claim 1, wherein said determining whether the first window of the video call shields the predetermined message display position during display of the first window, based on the window type comprises:
in response to the window type being a non-full-screen window, determining that the first window shields the predetermined message display position during display of the first window, wherein a display position of the non-full-screen window is configured to locate in an area which overlaps with the predetermined message display position, and
in response to the window type being a full-screen window, determining whether the video call is disconnected, and in response to the video call being connected, determining that the first window shields the predetermined message display position during display of the first window.

3. The method according to claim 1, wherein said determining whether the first window of the video call shields the predetermined message display position during display of the first window, based on the window type comprises:
in response to the window type being a full-screen window, determining that the first window of the video call shields the predetermined message display position during display of the first window; and
in response to the window type being a non-full-screen window, determining whether the first window of the video call shields the predetermined message display position during display of the first window according to a predetermined display position of the first window.

4. The method according to claim 3, wherein said determining whether the first window of the video call shields the predetermined message display position during display of the first window according to the predetermined display position of the first window comprises:
in response to the predetermined display position of the first window overlapping with the predetermined message display position, determining that the first window shields the predetermined message display position during display of the first window; and
in response to the predetermined display position of the first window not overlapping with the predetermined message display position, determining that the window type does not shield the predetermined message display position during display of the first window.

5. The method according to claim 1, wherein said determining the current message display position that is not shielded by the first window on the television screen interface comprises:
in response to the first window being a non-full-screen window, determining a substitute position associated with the predetermined message display position on the television screen interface as the current message display position, wherein the substitute position is located in a region not occupied by the first window with a predetermined size on the television screen interface.

6. The method according to claim 1, wherein said determining the current message display position that is not shielded by the first window on the television screen interface comprises:
in response to the first window being a full-screen window, switching the first window to a second window and displaying the second window at a predetermined position of the television screen interface, wherein the second window is a non-full-screen call window; and obtaining a substitute position associated with the predetermined position on the television screen interface as the current message display position, wherein the substitute position is located in a region not occupied by the second window on the television screen interface.

7. The method according to claim 6, wherein the second window comprises multiple sizes of non-full-screen windows;

said switching the first window to the second window comprises:

obtaining a size of the message alert box corresponding to the instruction;

calculating a maximum size value for the second window according to the size of the message alert box and a size of the television screen interface; and switching the first window to a second window whose size is smaller than the maximum size value for the second window.

8. The method according to claim 1, wherein said determining the current message display position that is not shielded by the first window on the television screen interface comprises:

in response to the first call window being a full-screen window and a message corresponding to the instruction being a television application message, determining the predetermined message display position as the current message display position that is not shielded by the first window.

9. The method according to claim 1, further comprising:

in response to receiving the instruction for displaying a message, determining whether the video call is performed on the smart television; and in response to no video call being performed on the smart television, displaying a message corresponding to the instruction on the predetermined message display position.

10. A smart television, comprising:

a display configured to display an image;

a memory, configured to store computer programs;

a processor, configured to execute the computer programs stored in the memory to cause the smart television to:

in response to receiving an instruction for displaying a message during a video call, determine a window type of the video call displayed on a television screen interface;

determine whether a first window of the video call shields a predetermined message display position during display of the first window, based on the window type;

in response to the window type being a type that shields the predetermined message display position during display of the first window, determine a current message display position that is not shielded by the first window on the television screen interface; and display a message alert box associated with the instruction at the current message displaying position, wherein the message alert box is not shielded by the first window.

11. The smart television according to claim 10, wherein the processor is further configured to execute the computer programs stored in the memory to cause the smart television to:

in response to the window type being a non-full-screen window, determine that the first window shields the predetermined message display position during display of the first window, wherein a display position of the non-full-screen window is configured to locate in an area which overlaps with the predetermined message display position, and in response to the window type being a full-screen window, determine whether the video call is disconnected, and in response to the video call being connected, determine that the first window shields the predetermined message display position during display of the first window.

12. The smart television according to claim 10, wherein the processor is further configured to execute the computer programs stored in the memory to cause the smart television to:

in response to the window type being a full-screen window, determine that the first window of the video call shields the predetermined message display position during display of the first window; and in response to the window type being a non-full-screen window, determine whether the first window of the video call shields the predetermined message display position during display of the first window according to a predetermined display position of the first window.

13. The smart television according to claim 12, wherein the processor is further configured to execute the computer programs stored in the memory to cause the smart television to:

determine whether the first window of the video call shields the predetermined message display position during display of the first window according to the predetermined display position of the first window by:

in response to the predetermined display position of the first window overlapping with the predetermined message display position, determining that the first window shields the predetermined message display position during display of the first window; and in response to the predetermined display position of the first window not overlapping with the predetermined message display position, determining that the window type does not shield the predetermined message display position during display of the first window.

14. The smart television according to claim 10, wherein the processor is further configured to execute the computer programs stored in the memory to cause the smart television to:

in response to the first window being a non-full-screen window, determine a substitute position associated with the predetermined message display position on the television screen interface as the current message display position, wherein the substitute position is located in a region not occupied by the first window with a predetermined size on the television screen interface.

15. The smart television according to claim 10, wherein the processor is further configured to execute the computer programs stored in the memory to cause the smart television to:

in response to the first window being a full-screen window, switch the first window to a second window and displaying the second window at a predetermined position of the television screen interface, wherein the second window is a non-full-screen call window; and obtain a substitute position associated with the predetermined position on the television screen interface as the current message display position, wherein the substitute position is located in a region not occupied by the second window on the television screen interface.

16. The smart television according to claim 15, wherein the second window comprises multiple sizes of non-fullscreen windows, and the processor is further configured to execute the computer programs stored in the memory to cause the smart television to:
- obtain a size of the message alert box corresponding to the instruction;
- calculate a maximum size value for the second window according to the size of the message alert box and a size of the television screen interface; and
- switch the first window to a second window whose size is smaller than the maximum size value for the second window.

17. The smart television according to claim 10, wherein the processor is further configured to execute the computer programs stored in the memory to cause the smart television to:
- in response to the first call window being a full-screen window and a message corresponding to the instruction being a television application message, determine the predetermined message display position as the current message display position that is not shielded by the first window.

18. The smart television according to claim 10, wherein the processor is further configured to execute the computer programs stored in the memory to cause the smart television to:
- in response to receiving the instruction for displaying a message, determine whether the video call is performed on the smart television; and
- in response to no video call being performed on the smart television, displays a message corresponding to the instruction on the predetermined message display position.

* * * * *